US009874110B2

(12) United States Patent
Vandervaart et al.

(10) Patent No.: US 9,874,110 B2
(45) Date of Patent: Jan. 23, 2018

(54) COOLED GAS TURBINE ENGINE COMPONENT

(71) Applicant: Rolls-Royce North American Technologies, Inc., Indianapolis, IN (US)

(72) Inventors: Peter C. Vandervaart, Indianapolis, IN (US); Jeffrey F. Rhodes, Zionsville, IN (US); Okey Kwon, Indianapolis, IN (US); Tab M. Heffernan, Plainfield, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 1166 days.

(21) Appl. No.: 14/141,912

(22) Filed: Dec. 27, 2013

(65) Prior Publication Data

US 2015/0016944 A1 Jan. 15, 2015

Related U.S. Application Data

(60) Provisional application No. 61/774,419, filed on Mar. 7, 2013.

(51) Int. Cl.
- *F01D 5/18* (2006.01)
- *F01D 25/12* (2006.01)

(52) U.S. Cl.
CPC .............. *F01D 25/12* (2013.01); *F01D 5/186* (2013.01); *F01D 5/187* (2013.01);
(Continued)

(58) Field of Classification Search
CPC .......... F01D 25/12; F01D 5/182; F01D 5/183; F01D 5/184; F01D 5/186; F01D 5/187;
(Continued)

(56) References Cited

U.S. PATENT DOCUMENTS

| 3,859,785 A | 1/1975 | Leto et al. |
| 4,063,851 A | 12/1977 | Weldon |

(Continued)

FOREIGN PATENT DOCUMENTS

| EP | 896127 A2 | 2/1999 |
| EP | 1091092 A2 | 4/2001 |

(Continued)

OTHER PUBLICATIONS

International Search Report for PCT International Application Serial No. PCT/US2013/077966, dated Dec. 27, 2013, (10 pages).

*Primary Examiner* — Gregory Anderson
*Assistant Examiner* — Danielle M Christensen
(74) *Attorney, Agent, or Firm* — Barnes & Thornburg LLP

(57) ABSTRACT

A gas turbine component having a cooling passage is disclosed. In one form, the passage is oriented as a turned passage capable of reversing direction of flow, such as a turned cooling hole. The gas turbine engine component can include a layered structure having cooling flow throughout a region of the component. The cooling hole can be in communication with a space in the layered structure. The gas turbine engine component can be a cast article where a mold can be constructed to produce the cooling hole having a turn.

16 Claims, 4 Drawing Sheets

(52) U.S. Cl.
CPC .... *F05D 2230/21* (2013.01); *F05D 2260/202* (2013.01); *Y02T 50/676* (2013.01)

(58) Field of Classification Search
CPC . F05D 2230/21; F05D 2260/202; B22C 9/10; B22C 9/103
See application file for complete search history.

(56) References Cited

U.S. PATENT DOCUMENTS

| | | |
|---|---|---|
| 4,637,449 A | 1/1987 | Mills et al. |
| 4,672,727 A | 6/1987 | Field |
| 4,762,464 A | 8/1988 | Vertz et al. |
| 4,992,025 A | 2/1991 | Stroud et al. |
| 5,062,768 A | 11/1991 | Marriage |
| 5,152,667 A | 10/1992 | Turner et al. |
| 5,246,340 A | 9/1993 | Winstanley et al. |
| 5,288,207 A | 2/1994 | Linask |
| 5,353,865 A | 10/1994 | Adiutori et al. |
| 5,374,162 A | 12/1994 | Green |
| 5,383,766 A | 1/1995 | Przirembel et al. |
| 5,387,085 A | 2/1995 | Thomas et al. |
| 5,392,515 A | 2/1995 | Auxier et al. |
| 5,405,242 A | 4/1995 | Auxier et al. |
| 5,419,039 A | 5/1995 | Auxier et al. |
| 5,419,681 A | 5/1995 | Lee |
| 5,458,461 A | 10/1995 | Lee et al. |
| 5,472,316 A | 12/1995 | Taslim et al. |
| 5,496,151 A | 3/1996 | Coudray et al. |
| 5,498,133 A | 3/1996 | Lee |
| 5,511,946 A | 4/1996 | Lee et al. |
| 5,533,864 A | 7/1996 | Nomoto et al. |
| 5,649,806 A | 7/1997 | Scricca et al. |
| 5,702,232 A | 12/1997 | Moore |
| 5,813,836 A | 9/1998 | Starkweather |
| 5,816,777 A | 10/1998 | Hall |
| 5,820,774 A | 10/1998 | Dietrich et al. |
| 5,931,638 A | 8/1999 | Krause et al. |
| 5,941,686 A | 8/1999 | Gupta et al. |
| 6,000,908 A | 12/1999 | Bunker |
| 6,176,676 B1 | 1/2001 | Ikeda et al. |
| 6,183,199 B1 | 2/2001 | Beeck et al. |
| 6,213,714 B1 | 4/2001 | Rhodes |
| 6,224,339 B1 | 5/2001 | Rhodes et al. |
| 6,234,754 B1 | 5/2001 | Zelesky et al. |
| 6,247,896 B1 | 6/2001 | Auxier et al. |
| 6,267,552 B1 | 7/2001 | Weigand |
| 6,322,322 B1 | 11/2001 | Rhodes et al. |
| 6,379,118 B2 | 4/2002 | Lutum et al. |
| 6,383,602 B1 | 5/2002 | Fric et al. |
| 6,402,470 B1 | 6/2002 | Kvasnak et al. |
| 6,547,525 B2 | 4/2003 | Haehnle et al. |
| 6,612,808 B2 | 9/2003 | Lee et al. |
| 6,729,140 B2 | 5/2004 | Newton et al. |
| 6,744,010 B1 | 6/2004 | Pepe et al. |
| 6,832,486 B2 | 12/2004 | Care et al. |
| 6,890,153 B2 | 5/2005 | Demers et al. |
| 6,894,100 B2 | 5/2005 | Miyoshi et al. |
| 6,955,522 B2 | 10/2005 | Cunha et al. |
| 7,033,135 B2 | 4/2006 | Mortzheim et al. |
| 7,186,085 B2 | 3/2007 | Lee |
| 7,224,082 B2 | 5/2007 | Bouiller et al. |
| 7,232,290 B2 | 6/2007 | Draper et al. |
| 7,246,992 B2 | 7/2007 | Lee |
| 7,251,942 B2 | 8/2007 | Dittmar et al. |
| 7,287,959 B2 | 10/2007 | Lee et al. |
| 7,328,580 B2 | 2/2008 | Lee et al. |
| 7,374,401 B2 | 5/2008 | Lee |
| 7,495,354 B2 | 2/2009 | Herrmann |
| 7,537,431 B1 | 5/2009 | Liang |
| 7,607,891 B2 | 10/2009 | Cherolis et al. |
| 7,704,039 B1 | 4/2010 | Liang |
| 7,717,677 B1 | 5/2010 | Liang |
| 7,721,555 B2 | 5/2010 | Sharp et al. |
| 7,722,325 B2 | 5/2010 | Cunha |
| 7,753,650 B1 | 7/2010 | Liang |
| 7,785,070 B2 | 8/2010 | Liang |
| 7,815,414 B2 | 10/2010 | Devore et al. |
| 7,820,267 B2 | 10/2010 | Fahndrich |
| 7,927,073 B2 | 4/2011 | Scott et al. |
| 8,167,559 B2 | 5/2012 | Liang |
| 8,469,666 B1 | 6/2013 | Liang |
| 8,777,570 B1 | 7/2014 | Liang |
| 2004/0197191 A1 | 10/2004 | Cunha et al. |
| 2005/0111979 A1* | 5/2005 | Liang ............ F01D 5/20 416/97 R |
| 2007/0044933 A1* | 3/2007 | Santeler ............ B22C 7/02 164/44 |
| 2008/0265580 A1 | 10/2008 | Sharp |
| 2009/0020257 A1* | 1/2009 | Frasier ............ B22D 47/00 164/122.2 |
| 2009/0047136 A1* | 2/2009 | Chon ............ F01D 5/187 416/97 R |
| 2009/0068022 A1 | 3/2009 | Liang |
| 2009/0115295 A1 | 5/2009 | Colin |
| 2009/0274946 A1 | 11/2009 | Johnson |
| 2010/0054953 A1 | 3/2010 | Piggush |
| 2010/0068032 A1 | 3/2010 | Liang |
| 2010/0074763 A1 | 3/2010 | Liang |
| 2010/0226755 A1* | 9/2010 | Liang ............ F01D 5/187 415/115 |
| 2010/0247329 A1 | 9/2010 | Morgan |
| 2010/0290921 A1 | 11/2010 | Mhetras |
| 2010/0304161 A1* | 12/2010 | Huang ............ B22D 27/045 428/469 |
| 2011/0068517 A1* | 3/2011 | Maguire ............ C04B 33/32 264/610 |
| 2011/0110790 A1 | 5/2011 | Itzel et al. |
| 2012/0201653 A1 | 8/2012 | Moga et al. |
| 2013/0108471 A1 | 5/2013 | Fujimoto |
| 2014/0199177 A1* | 7/2014 | Propheter-Hinckley F01D 5/187 416/97 R |

FOREIGN PATENT DOCUMENTS

| | | |
|---|---|---|
| EP | 1467064 A2 | 10/2004 |
| EP | 2159375 A2 | 3/2010 |
| WO | WO2012092279 A1 | 7/2012 |

* cited by examiner

COOLED GAS TURBINE ENGINE COMPONENT

CROSS REFERENCE TO RELATED APPLICATIONS

This application claims priority to and the benefit of U.S. Provisional Patent Application No. 61/774,419, filed 7 Mar. 2013, the disclosure of which is now expressly incorporated herein by reference.

TECHNICAL FIELD

The present disclosure generally relates to gas turbine engines having cooled components. More particularly, but not exclusively, the present disclosure relates to cooled airflow members having internal cooling passages.

BACKGROUND

Providing cooled gas turbine engine components remains an area of interest. Some existing systems have various shortcomings relative to certain applications. Accordingly, there remains a need for further contributions in this area of technology.

SUMMARY

One embodiment of the present invention is a unique gas turbine engine component having an internal cooling passage. Other embodiments include apparatuses, systems, devices, hardware, methods, and combinations for cooling a gas turbine engine component. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
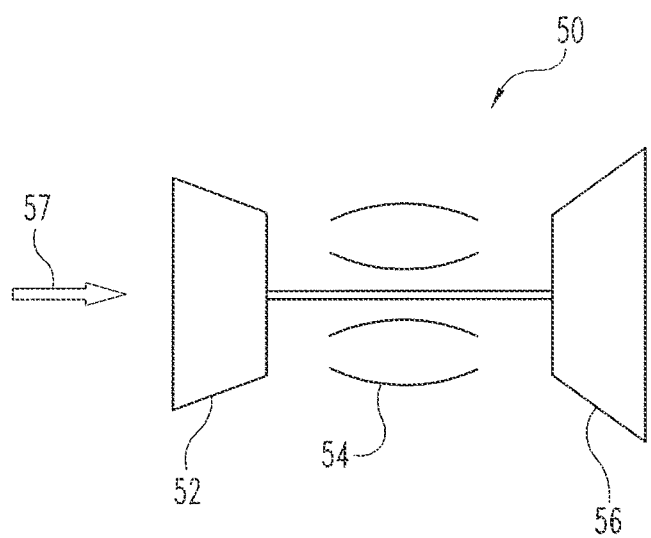
FIG. 1 is a depiction of one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

With reference to FIG. 1, a gas turbine engine 50 is depicted having turbomachinery that can be used to provide power to an aircraft. As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, the present inventions are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

In the illustrated embodiment, the gas turbine engine 50 includes a compressor 52, a combustor 54, and a turbine 56. An incoming flow stream of working fluid 57 is compressed by the compressor 52 after which it is delivered to the combustor 54 to be mixed with a fuel and combusted before being delivered to the turbine 56. The gas turbine engine 50 is depicted as a single spool turbojet engine, but it will be appreciated that the engine 50 can take on a variety of forms and may include additional spools. For example, the engine 50 can be a turboshaft, turboprop, or turbofan engine.

Figure 2:
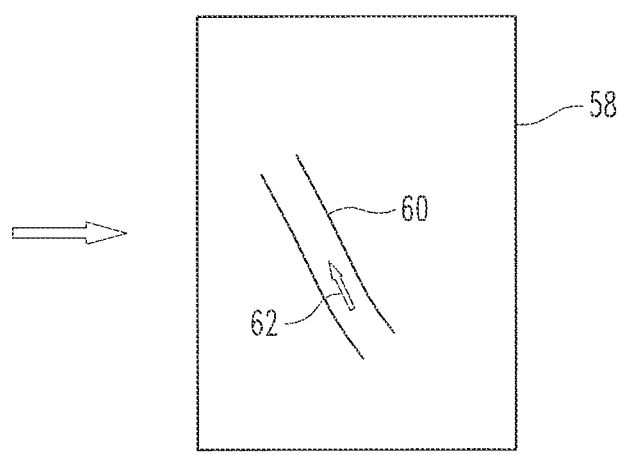
FIG. 2 is a depiction of a cooling passage in a component of a gas turbine engine.

In one form illustrated in FIG. 2, the turbomachinery of the gas turbine engine 50 can include a component 58 in thermal communication with a flow stream of the gas turbine engine 50. The component 58 includes an internal passage 60 for the conveyance of a working fluid 62 which can, but need not, be the same as the working fluid received and operated upon by the gas turbine engine 50. The working fluid 62 can be used to exchange heat with the member 58 and flow stream of the gas turbine engine 50. For example, if the flow stream is of relatively high temperature, then the working fluid 62 can be conveyed through the component 58 to keep it, or a portion thereof, at a relatively cool temperature. The working fluid 62 can originate from a variety of sources, and, in one form, is from the compressor 52 of the gas turbine engine. In one non-limiting embodiment, the working fluid 62 is from a compressor discharge of the gas turbine engine 50.

Figure 3:
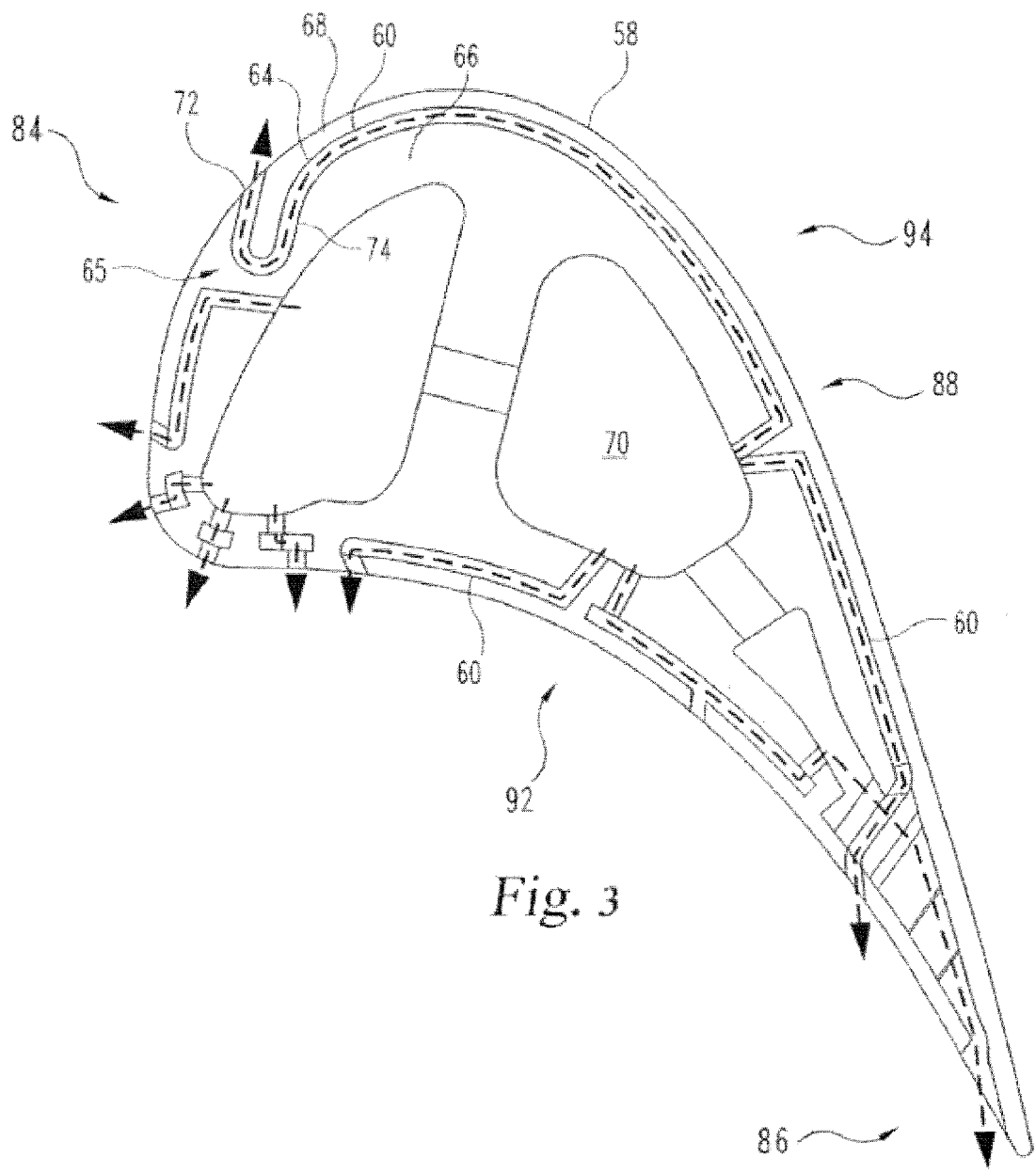
FIG. 3 is a depiction of one embodiment of a component.

Turning now to FIG. 3, one embodiment of the component 58 is shown as a cooled turbine blade having a number of internal passages 60 capable of conveying a cooled cooling air for the turbine blade. The component 58 includes a leading edge 84, a trailing edge 86, and a midspan 88 located between the leading edge 84 and trailing edge 86 as shown in FIG. 3. The component 58 has a pressure side 92 that extends between the leading edge 84 and the trailing edge 86 and a suction side 94 spaced apart from the pressure side 92 as shown in FIG. 3. A passage 64 is shown in this view as a passage having a turn 65 formed near the leading edge 84 of the blade, but other locations for the passage 64 are also contemplated herein. The passage 64 can be located anywhere in the airfoil. In one non-limiting embodiment, the passage 64 is located in areas to meet surface temperature and component life requirements. In one embodiment, the passage 64 is fluidly connected to a plenum 70 on the suction side 94 of the component 58 near the midspan 88 as shown in FIG. 3. In one embodiment, the turn of the passage 64 is included with a j-shape of the passage 64 in which the passage includes the turn 65 that reverses direction of a working fluid flowing in the passage. In one embodiment, the turn 65 is located near the leading edge 84 and has an outlet formed in the suction side 94 of the component 58 as shown in FIG. 3. The turn 65 can be a constant radius turn in some forms, but need not be constant radius in all embodiments. In some embodiments, the turn of the j-shape need not completely reverse direction. In still further embodiments, the passage can include portions on either side of the turn that are substantially similar such that the passage is similar to a u-shape. In still further form, the portions on either side of the turn may also include turns whether or not to the degree as depicted in the embodiment shown in the figure. Other shapes that include similar turns are also contemplated herein. As such, curvilinear turns are provided in the passage that include smooth curvilinear shapes, piecewise curvilinear shapes, and/or piecewise continuous shapes that have a general curved nature. In short, any variety of turns are contemplated herein for the passage.

The passage 64 in many embodiments is elongate having a cross sectional dimension smaller in dimension than the elongate length of the passage. Such passages in these embodiments are sometimes referred to as cooling holes and can take a variety of shapes as will be discussed below. For example, a cross sectional dimension such as a width, or perhaps a radius, is smaller than the elongate length of the passage. The elongate length of the passage can be the length of a line of the passage such as a line formed along the length of the passage through a centroid, geometric center, median center, etc. of the cross sectional shape. In some passages having non-circular shape the width referred to can be, for example, the largest cross sectional dimension of the passage. To set forth a non-limiting example, if the passage were of a rectangular shape the width can be the largest of the cross sectional dimensions associated with the rectangle. If the shape were ellipsoidal, the width can be a dimension such as the major axis. In any event, it will be appreciated that no matter the measure of width, a cross sectional dimension such as maximum width useful in defining, partially defining, or at least characterizing the passage in some fashion will be appreciated as less than the elongate length of the passage. As suggested in the discussion above, the passage can have a circular cross sectional shape in some embodiments, but other shapes are also contemplated. Furthermore, the cross sectional shape of the passage can vary over the length of the passage where in some cases it will still be the case that the elongate length is longer than a cross sectional dimension of the passage. In some forms the passage 64 is generally free from structural members that extend from one side of the cross section to the other such as to form a blockage on either side of which working fluid can pass, though in some embodiments protrusions may extend into the passage. For example, in some forms the cooling passage can be formed without pedestal support typically used between walls of an open interior of a cooled component.

Figure 4:
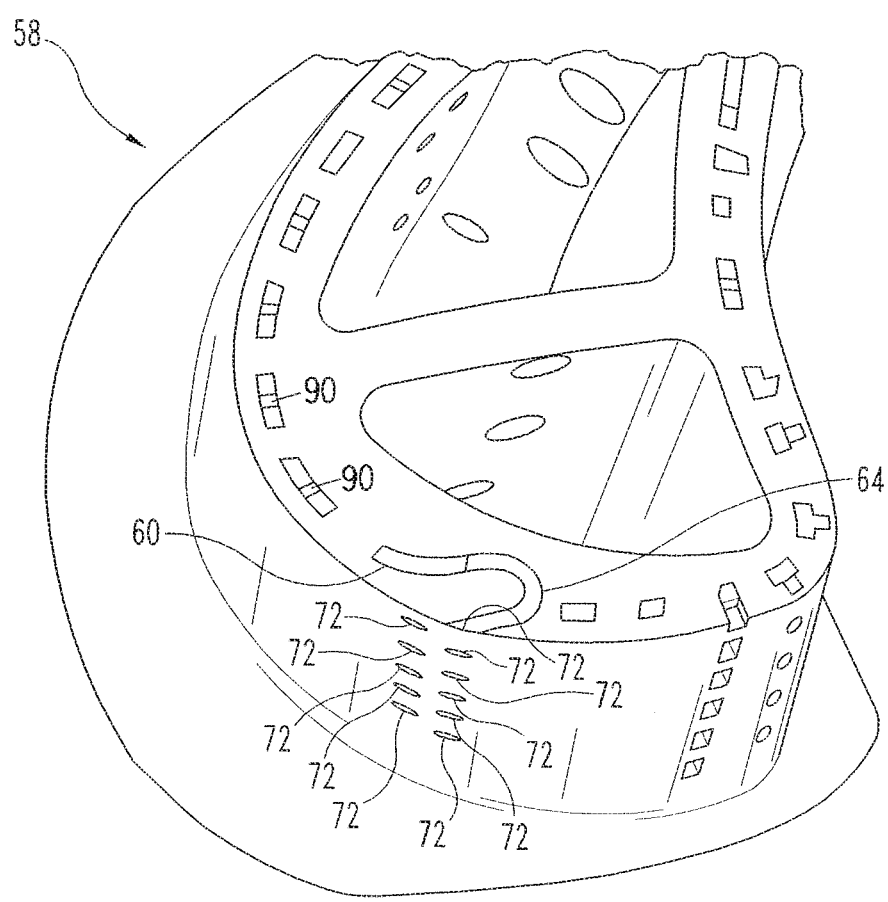
FIG. 4 is a depiction of one embodiment of a component.

Various embodiments of the component 58 can take the form of a multi-walled structure having one or more passages described above. In some forms, the multi-walled structure can be or take the form of a layered structure. The layered structure can have flow path configurations similar to a cooled component using constructions similar to those of cooled components sold under the trademark of LAMILLOY by Rolls-Royce Corporation, Indianapolis, Ind. One non-limiting example is shown in FIG. 3 which includes an inner wall 66 and an outer wall 68 between which are formed the passages. Either or both of the inner wall 66 and outer wall 68 can include shapes that extend in a variety of directions. For example, the outer wall 68 can include a portion disposed oriented toward the outer wall 68 near the turn 65. The illustrated embodiment also depicts a portion of the outer wall 68 around the turn 65 and toward the leading edge of the component 58. The layer structure can include a number of support features or other structures such as pedestals 90 arranged through the area of the layer around which working fluid will flow as shown in FIG. 4. The pedestals 90 can be positioned at a variety of span and chord locations an example of which will be appreciated by the mold core shown below. Various other embodiments can include any number of walls. Furthermore, in some embodiments, the passages can be formed in or through any of the walls.

Cooling air can be delivered to an interior of the component 58 and from which it is flowed through the passages to the exterior of the component 58. In one non-limiting embodiment, the component 58 includes a plenum 70 into which a cooling working fluid, such as air, is delivered prior to being flowed through the passages 60. The passages 60 can extend throughout a region of the component 58 and in one form includes a passage having a constant height between the walls, examples of which can be seen in the figure. The working fluid can flow through the passage 64, around the turn 65, and out an exit 72. The passage 60 leading to the passage 64 can extend over a relatively large area which feeds the passage 64. Multiple passages 64 can be arranged along the span of the component 58 and into which flows a working fluid that originated from a common passage 64. Other embodiments can include one or more passages 60 arranged to feed one or more passages 64. An example of such a configuration will be appreciated with the discussion below concerning a mold core useful in producing the component 58.

In the illustrated form, the passage 64 includes a portion 74 that is routed toward an interior of the component 58 prior to entering the turn 65. The portion 74 can be a generally linear form away from a portion that generally follows the exterior contour of the component 58, but need not be linear in all embodiments. Any variety of shapes of the passage 64 leading to the turn 65 is contemplated. Likewise, any variety of shapes extending from the turn 65, if any, is also contemplated.

FIG. 4 depicts a sectioned view of one embodiment of the component 58 in which one of the passages 60 is shown in side view. A number of exits 72 are also depicted along the span of the component 58. The exits 72 are shown in the illustrated embodiment as arranged generally along two rows extending along the span, but other embodiments can include any number of rows fewer or greater than those depicted. The rows are offset from one another along the curvature of the component 58. Furthermore, individual exits 72 are also staggered at different span locations relative to exits 72 in the adjacent row. Any variety of combinations of stagger, offset, or otherwise is contemplated as the exits 72 are distributed around the component 58.

Figure 5:
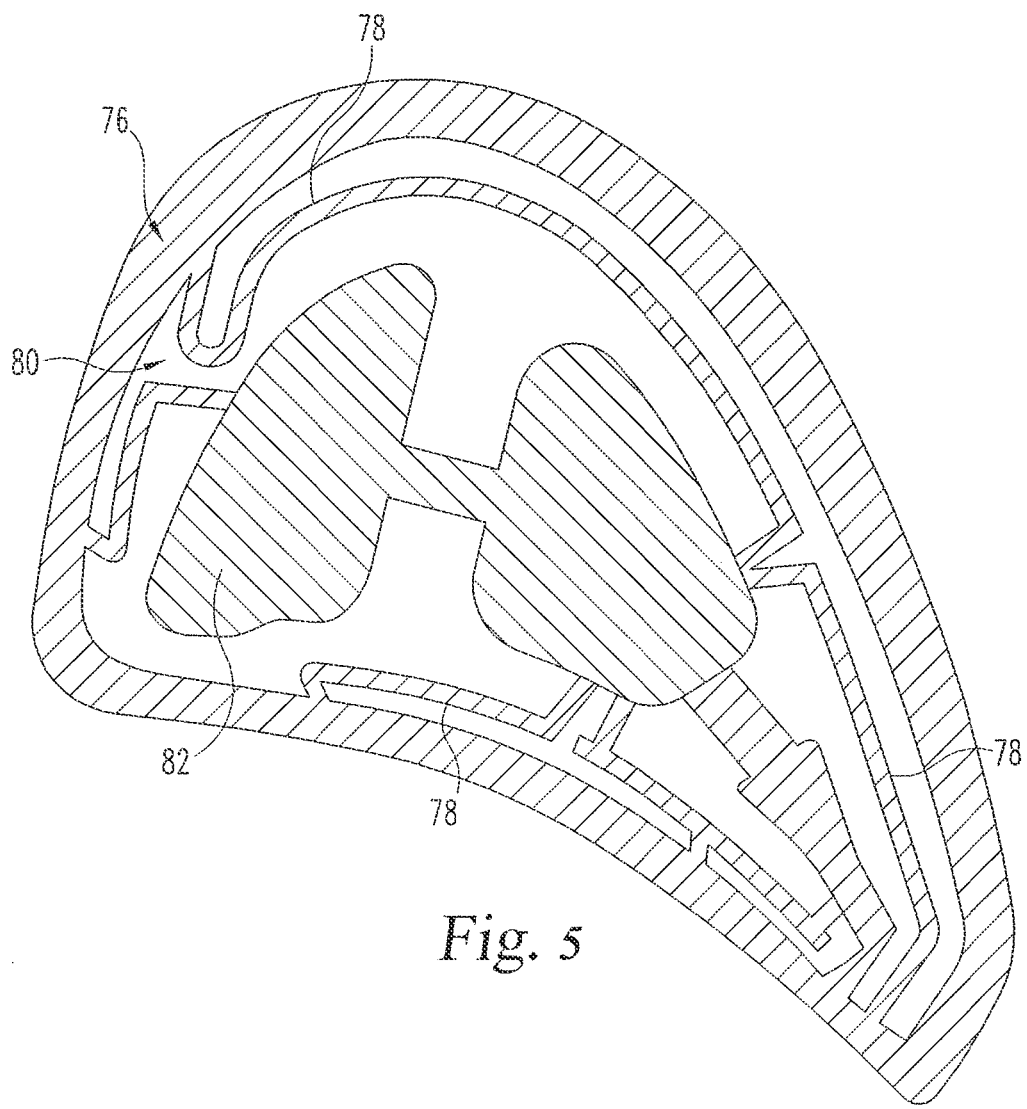
FIG. 5 is a depiction of one embodiment of a mold useful to produce a component.

FIG. 5 depicts one embodiment of a mold 76 useful in producing a cast version of the component 58. A molten material can be received into an internal cavity of the mold 76 such as is shown in the illustrated embodiment. The casting operation can be directionally solidified, equiaxed, single crystal, etc. In addition, the mold 76 can be coupled with a crystal selector and/or a seed crystal. In short, the mold 76 can be used in a variety of different casting operations and configurations. The mold 76 includes a mold passage portion 78 and a mold passage turn portion 80 that represent the passage 60 and passage 64, respectively. The mold passage turn portion 80 is depicted as extending from the mold passage portion 78, other embodiments can locate the mold passage turn portion 80 extending from other locations, such as but not limited to a plenum forming portion 82.

The mold 76 can be used, in conjunction with other members, etc. to form a cast component net shape article, but in some forms the mold 76 can be used to form an intermediate construction of a component 58. For example, the mold 76 can include various features, such as the mold passage portion 78 and/or the mold turn portion 80, but not otherwise include provisions to cast one or more portions of a cast component. The outer surface could be a layer to be affixed to a core formed from a cast operation of a mold 76 that forms only part of a complete component 58. The cast component 58 can thus have a layered structure by virtue of the cast operation or a subsequent layering operation. The term layer used in the sense to describe multiple levels is thus descriptive to include a component having a layered construction whether formed in an initial construction or process of construction.

The mold 76 can be formed using any variety of techniques. To set forth just one non-limiting example, the mold 78 can be formed using free form fabrication. Such free form fabrication can be any one of a number of different approaches, of which laser stereolithography is only but one example. Other approaches can utilize an ultraviolet light that is projected onto a slurry such that an entire layer is cured in one exposure. In one form of construction, a photocurable monomer binder is mixed with a particulate material to create a slurry. In one form, the particulate material is a ceramic particulate. Upon activation of the slurry by an electromagnetic excitation, such as via a laser, the monomer binder can polymerize to form a rigid or semi-rigid green article. The mold 78 can be formed as an integral construction, but in other forms the mold 78 can include portions that are separately made and joined together for a casting operation. The green article can be thermally processed, among other potential processing approaches, to burn out the cured binder leaving behind the ceramic particle which can be fused at elevated temperatures. Any variety of approaches can be used to burn out the binder and fuse the particulate matter.

One aspect of the present application provides an apparatus comprising a casting mold having a core shaped to form a gas turbine engine airflow component as a result of a casting operation. The casting mold includes a space bound by a first side and a second side configured to produce a portion of the gas turbine engine airflow component and a cooling hole core is disposed in the space and configured to provide a cooling hole having an upstream end and a downstream end after a casting operation of the casting mold. The cooling hole core is turned in a curvilinear shape along its length as it extends between the first side and second side.

One feature of the present application provides wherein the cooling hole core is located on an airfoil portion of the casting mold. Another feature of the present application provides wherein the cooling hole core is turned to reverse a direction as it extends between the first side and the second side, and wherein the cooling hole core is located at a leading edge region of the airfoil portion.

Still another feature of the present application further includes an inter-wall cooling core coupled with the cooling hole core, the inter-wall cooling core having a plurality of pedestal core portions used to form pedestals in a cast article. Yet another feature of the present application provides wherein the cooling hole core includes a plurality of cooling hole cores.

Still yet another feature of the present application provides wherein the casting mold is a free-form fabricated processed component, and wherein the cooling hole core is substantially free of support members. A further feature of the present application provides wherein the cooling hole core includes a plurality of cooling hole cores, and wherein the plurality of cooling hole cores includes staggered outlets.

Another aspect of the present application provides an apparatus comprising a cooled gas turbine engine component having a wall forming a boundary of an internal passage used for conveyance of a cooling fluid, and a cooling hole extending between a hot-side and a cold-side of the cooled gas turbine engine component having a first end oriented to receive cooling fluid from the internal passage and a second end having an outlet capable of discharging the cooling fluid from the gas turbine engine component. The cooling hole having opposing sides routed along a curvilinear path.

A feature of the present application provides wherein the cooled gas turbine engine component is a multi-walled cooled component. The internal passage is situated between a hot-side wall and a cold-side wall of an inter-wall passage.

Another feature of the present application provides wherein the curvilinear path of the cooling hole is near a leading edge of the multi-wall cooled component. Yet another feature of the present application provides wherein the inter-wall passage includes a plurality of pedestals, and wherein the cooling hole is substantially free of pedestals.

Still yet another feature of the present application provides wherein the cooled gas turbine engine component includes a construction to permit transpiration cooling. A further feature of the present application provides wherein the cooling hole includes a plurality of cooling holes in flow communication with a transpiration cooling passage.

A yet further feature of the present application provides wherein the plurality of cooling holes include outlets in a leading edge region of the cooled gas turbine engine component, the plurality of cooling holes having a bend that reverses direction of the cooling fluid.

Yet another aspect of the present application provides a method comprising free form fabricating a gas turbine engine component core having an inner surface and an outer surface representing a cooling space of a cast gas turbine engine component, the fabricating including, building a core portion representing an internal flow space of the gas turbine engine component, and forming a cooling hole core fused with the core portion and having a first end and a second end and a bend intermediate the first and second ends. The cooling hole core coupled with the core portion.

A feature of the present application provides wherein the free-form fabricating includes rigidizing a binder material that includes particulates, and wherein the bend is oriented to reverse direction of the cooling hole core. Another feature of the present application provides wherein the gas turbine engine component is a cooled turbine airflow member, and wherein the building includes defining a central passage internal core located inwardly of the core portion oriented to produce a multi-walled gas turbine engine component.

Yet another feature of the present application further includes producing an opening in the core portion representing an internal flow space configured to produce a pedestal used to support opposing walls. Still another feature of the present application provides wherein the fabricating includes developing a refractory mold having portions oriented to create a multi-walled, cooled gas turbine engine component, and wherein the cooling hole core includes a circular cross section.

Still another aspect of the present application provides a method. The method comprising providing a cooling fluid to a cooled gas turbine engine component, flowing the cooling fluid through an inner space of the gas turbine engine component, and directing the cooling fluid from the inner space to a turned cooling hole of the gas turbine engine component.

A feature of the present application further includes ejecting cooling fluid from a plurality of turned cooling holes of the gas turbine engine component. Another feature of the present application provides wherein the flowing includes conveying the cooling fluid between an inner wall and an outer wall oriented to follow an exterior contour of the gas turbine engine component, the inner wall and outer wall defining the inner space.

Yet another feature of the present application further includes delivering cooling fluid to a plenum of the cooled gas turbine engine component, and wherein the conveying includes routing the cooling fluid around pedestals disposed between the inner wall and the outer wall. Still yet another feature of the present application provides wherein the directing the cooling fluid leads to reversing a direction of flow of the cooling fluid as a result of the turned cooling hole.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An apparatus comprising:
   a cooled gas turbine engine component having a leading edge, a trailing edge spaced apart from the leading edge, and a midspan located between the leading edge and the trailing edge, the component including an inner wall that defines a plenum and an outer wall arranged around the inner wall;
   a first internal passage located between the inner wall and the outer wall and used for conveyance of a cooling fluid, the first internal passage fluidly connected to the plenum on a suction side of the component near the midspan;
   a first cooling hole extending between the inner wall and outer wall and having a first end oriented to receive cooling fluid from the first internal passage and a second end having an outlet formed in a suction side of the component near the leading edge and being capable of discharging the cooling fluid from the gas turbine engine component, the first cooling hole having opposing sides routed along a curvilinear path, and
   a second internal passageway located between the inner wall and the outer wall and used for conveyance of a cooling fluid and a second cooling hole located between the inner wall and the outer wall, the second internal passage fluidly connected to the plenum on the suction side of the component near the midspan, and the second cooling hole having a first end oriented to receive cooling fluid from the second internal passage and a second end having an outlet formed in a pressure side of the component near the trailing edge.

2. The apparatus of claim 1, wherein the first internal passage includes a plurality of pedestals, and wherein the first cooling hole is substantially free of pedestals.

3. The apparatus of claim 1, wherein the first cooling hole includes a bend that reverses direction of the cooling fluid.

4. The apparatus of claim 1, wherein the cooled gas turbine engine component further includes a casting mold having a core shaped to form the gas turbine component as a result of a casting operation, the casting mold including a space bound by a first side and a second side configured to produce a portion of the gas turbine engine component, a cooling hole core disposed in the space and configured to provide the cooling hole having an upstream end and a downstream end, the cooling hole core having a curvilinear shape along its length as it extends between the first side and second side.

5. The apparatus of claim 4, wherein the cooling hole core is located on an airfoil portion of the casting mold.

6. The apparatus of claim 5, wherein the cooling hole core is turned to reverse a direction as it extends between the first side and the second side, and wherein the cooling hole core is located at a leading edge region of the airfoil portion.

7. The apparatus of claim 4, which further includes a mold passage portion coupled with the cooling hole core, the mold passage portion having a plurality of pedestal core portions.

8. The apparatus of claim 7, wherein the cooling hole core includes a plurality of cooling hole cores.

9. The apparatus of claim 4, wherein the casting mold is a free-form fabricated processed component, and wherein the cooling hole core is substantially free of support members; and wherein the cooling hole core includes a plurality of cooling hole cores, and wherein the plurality of cooling hole cores includes staggered outlets.

10. The apparatus of claim 1, wherein the second internal passage includes a plurality of pedestals and the second cooling hole is substantially free of pedestals.

11. A method comprising:
    free form fabricating a gas turbine engine component core having an inner surface and an outer surface representing a cooling space of a cast gas turbine engine component, the fabricating including;
    building a core portion representing an internal flow space of the gas turbine engine component;
    forming a first cooling hole core fused with the core portion and having a first end and a second end and a bend intermediate the first and second ends, the first end of the first cooling hole core coupled with the core portion at a leading edge of the core portion;
    forming a second cooling hole core fused with the core portion and having a first end and a second end, the first end of the second cooling hole core coupled with the core portion at a trailing edge of the core portion on a pressure side of the core portion; and
    wherein the gas turbine engine component is a cooled turbine airflow member, and the fabricating further includes forming a first internal passage core that extends from a midspan of the core portion toward the leading edge of the core portion and forming a second internal passage core that extends from the midspan of the core portion on a suction side of the core portion toward the trailing edge of the core portion, the first internal passage core is coupled with the second end of the first cooling hole core, and the second internal passage core is coupled with the second end of the second cooling hole core.

12. The method of claim 11, wherein the free-form fabricating includes rigidizing a binder material that includes particulates, and wherein the bend is oriented to reverse direction of the cooling hole core.

13. The method of claim 11, wherein the fabricating includes developing a refractory mold having portions oriented to create a multi-walled, cooled gas turbine engine component, and wherein the cooling hole core includes a circular cross section.

14. A method comprising:
providing a cooling fluid to a cooled gas turbine engine component;
flowing a first portion of the cooling fluid through an inner space of the gas turbine engine component from a suction side of the component near a midspan of the component toward a leading edge of the component;
directing the first portion of the cooling fluid from the inner space to a turned cooling hole of the gas turbine engine component, the turned cooling hole formed in the suction side of the component near the leading edge;
ejecting the first portion of the cooling fluid out of the turned cooling hole, and
flowing a second portion of the cooling fluid from the suction side of the component near the midspan of the component toward a trailing edge of the component;
directing the second portion of the cooling fluid along a contour of the component; and
ejecting the second portion of the cooling fluid out of a pressure side of the component near the trailing edge.

15. The method of claim 14, wherein the flowing the first portion of the cooling fluid includes conveying the cooling fluid between an inner wall and an outer wall oriented to follow an exterior contour of the gas turbine engine component, the inner wall and outer wall defining the inner space, and further including delivering cooling fluid to a plenum of the cooled gas turbine engine component, and wherein the conveying includes routing the cooling fluid around pedestals disposed between the inner wall and the outer wall.

16. The method of claim 14, wherein the directing the first portion of the cooling fluid leads to reversing a direction of flow of the first portion of the cooling fluid as a result of the turned cooling hole.

* * * * *